United States Patent
Ishibashi et al.

(10) Patent No.: US 7,494,636 B2
(45) Date of Patent: Feb. 24, 2009

(54) HIGHLY DISPERSIBLE FINE HYDROPHOBIC SILICA POWDER AND PROCESS FOR PRODUCING THE SAME

(75) Inventors: Naruyasu Ishibashi, Yokkaichi-shi (JP); Rikio Saito, Yokkaichi-shi (JP); Takeyoshi Shibasaki, Yokkaichi-shi (JP)

(73) Assignee: Nippon Aerosil Co., Ltd., Tokyo (JP)

( * ) Notice: Subject to any disclaimer, the term of this patent is extended or adjusted under 35 U.S.C. 154(b) by 499 days.

(21) Appl. No.: 10/540,002

(22) PCT Filed: Dec. 25, 2003

(86) PCT No.: PCT/JP03/16807

§ 371 (c)(1), (2), (4) Date: Jun. 21, 2005

(87) PCT Pub. No.: WO2004/060803

PCT Pub. Date: Jul. 22, 2004

(65) Prior Publication Data

US 2006/0067867 A1    Mar. 30, 2006

(30) Foreign Application Priority Data

Dec. 27, 2002    (JP) ............................ 2002-379842

(51) Int. Cl.
*C01B 33/12*    (2006.01)
(52) U.S. Cl. ...................................... 423/335; 423/337
(58) Field of Classification Search ................. 423/335, 423/337
See application file for complete search history.

(56) References Cited

U.S. PATENT DOCUMENTS

| | | | |
|---|---|---|---|
| 3,924,029 A | 12/1975 | Schutte et al. | |
| 4,868,084 A * | 9/1989 | Uchide et al. | 430/108.3 |
| 6,077,640 A | 6/2000 | Komai et al. | |
| 6,800,413 B2 * | 10/2004 | Barthel et al. | 430/108.3 |
| 2003/0027896 A1 | 2/2003 | Amano et al. | |

FOREIGN PATENT DOCUMENTS

EP    0 799 791    10/1997

OTHER PUBLICATIONS

U.S. Appl. No. 10/540,002, filed Jun. 21, 2005, Ishibashi, et al.
U.S. Appl. No. 10/880,601, filed Jul. 1, 2004, Amano, et al.

* cited by examiner

*Primary Examiner*—Timothy C Vanoy
*Assistant Examiner*—Serena L Hanor
(74) *Attorney, Agent, or Firm*—Oblon, Spivak, McClelland, Maier & Neustadt, P.C.

(57) ABSTRACT

A high dispersible hydrophobic fine silica powder can be made, wherein the silica powder has hydrophobicity of more than 50%, triboelectrostatic charge of more than −500 μC/g, decomposition rate of an organic group on the powder surface of less than 15%, transmittance of a 5% alcoholic dispersion liquid of more than 40% preferably, and a specific surface area of more than 200 m$^2$/g. This high dispersible hydrophobic fine silica powder can be made by mixing a hydrophobic agent comprising a volatile organic silicon compound in the gas state with a fine silica powder in a fluidized bed type reaction vessel at the time of a hydrophobic treatment, and controlling a gas flow rate to more than 5.0 cm/sec at the time of this mixing.

12 Claims, No Drawings

HIGHLY DISPERSIBLE FINE HYDROPHOBIC SILICA POWDER AND PROCESS FOR PRODUCING THE SAME

BACKGROUND OF THE INVENTION

1. Field of the Invention

The present invention relates to a high dispersible hydrophobic fine silica powder and a production method thereof. The high dispersible hydrophobic fine silica powder of the present invention is suitable as a filler for controlling a viscosity for resins, such as adhesives, coating materials or the like, a reinforcing filler for natural rubber, synthetic rubber, engineering plastics or the like, a filler for an antiblocking agent for films of polyethylene, polyester or the like, or a flowability improving agent for toners for electrophotography, powder coating materials or the like.

2. Description of the Prior Art

It has been known that a silica powder can have a multi-function property, by surface modifying with silane coupling agents or surface modifying agents, such as polymer or the like, according to its use and chemically changing hydroxyl groups on the powder surface. For example, it has been carried out that a silica powder generally having hydrophilicity with the hydroxyl groups on the powder surface is changed to the hydrophobic silica powder by using suitable coupling agents or polymer. More concretely, the hydrophobic silica carried out a hydrophobic treatment with an organic halosilane has been publicly known conventionally, and this silica is described, for example, in the specification of West German Patent No. 63784.

The hydrophobic fine silica powder is used as the filler and the reinforcing material of resins, the fluidizing agent of a resin powder, or the like. By the hydrophobic treatment, when the fine silica powder is added to resins, such as silicone resins, epoxy resins or the like, it is possible to increase the dispersibility of the resin, and also increase a mechanical strength of the hardened materials. Further, it is possible to obtain the effects, such as increasing the flowability of the resin powder, preventing the adsorption of moisture, or the like. Especially, it has been known that the fine silica powder having a large specific surface area is effective to increase the flowability of the resin powder since it has a small average primary particle size, and to have a high reinforcing effect as the filler for resins, rubbers or plastics. Further, in the case of a transparent resin or the like, it has been known that the resin has a high transmittance in its transparency.

As for the conventional hydrophobic silica powder, the powder having the comparatively small specific surface area, more concretely, having the specific surface area of less than 200 m²/g can have the uniform hydrophobicity. However, the hydrophobic treated silica powder having the specific surface area of more than 200 m²/g, has problems mostly that the uniformities of the hydrophobicity and the treatment are low. In this case, even when the amount of the hydrophobic agent is increased in order to increase the treating effect, it is difficult to obtain the uniformly hydrophobic silica powder since the fine silica powder having the large specific surface area has a strong agglomeration. So, it has been provided that a gas flow rate in the fluidized bed is controlled in the range of from 1.4 to 3.0 cm/sec by controlling the flowing rate to prevent the scattering of silica. By this way, the amount of the treating agent can be decreased without decreasing the hydrophobic treating level. (Japanese Patent Laid Open No. 2001-261327) However, this silica powder is not the fine silica powder having the large specific surface area provided in the present invention, but the powder is the grade having about 130 m²/g of the specific surface area.

Further, when the reaction temperature is increased in order to increase the treating efficiency, there is a problem that an organic group of the treating agent or on the surface of the silica powder is decomposed. When the organic group on the surface of the silica powder is decomposed, the hydrophobicity is not only bad influenced but also the property of the hydrophobic silica powder is influenced so much. For example, although triboelectrostatic charge is obtained by the surface contact with an iron powder, the objective triboelectrostatic charge cannot be obtained when the organic group on the powder surface is decomposed. Further, when the organic group on the powder surface is decomposed, the fine silica powder may be colored to yellowish or the like, with the generated carbon. Such yellowish color damages the appearance of the resins at the time of adding to silicone resins, acrylic resins or the like. Further, an electrostatic chargeability of the silica powder is decreased due to the conductivity of the generated carbon. Therefore, when said silica powder is used as an external additive for toners, powder coating materials or the like, the electric properties, such as the electrostatic chargeability, are damaged.

On the other hand, when the reaction time, that is, the staying time in reaction gas becomes long without increasing the reaction temperature, the productivity decreases. Moreover, in the case of using the fluidized bed type reaction vessel, when the staying time becomes long, the silica powder is easily agglomerated to decrease the dispersibility, thus the triboelectrostatic charge is bad influenced. Further, since the dispersibility is decreased, the transparency at the time of kneading with the resin is also damaged.

SUMMARY OF THE INVENTION

The present invention solves the above-described problems in the hydrophobic treatment of such fine silica powder, and provides the hydrophobic fine silica powder having the excellent dispersibility even having the large specific surface area.

The present invention relates to the high dispersible hydrophobic fine silica powder comprising the following constitutions, and the production method thereof

[1] A high dispersible hydrophobic fine silica powder, wherein hydrophobicity is more than 50%, triboelectrostatic charge to an iron powder is more than −500 μC/g, and decomposition rate of an organic group on the powder surface is less than 15%.

[2] The high dispersible hydrophobic fine silica powder according to above [1], wherein transmittance of a 5% alcoholic dispersion liquid is more than 40%.

[3] The high dispersible hydrophobic fine silica powder according to above [1] or [2], wherein said fine silica powder is synthesized by a vapor phase method, and has a specific surface area of more than 200 m²/g by a BET method and an amount of residual hydrochloride of less than 100 ppm.

[4] A production method of the high dispersible hydrophobic fine silica powder according to any one of from above [1] to [3], wherein a hydrophobic agent comprising a volatile organic silicon compound is mixed in the gas state with said fine silica powder in a fluidized bed type reaction vessel at the time of a hydrophobic treatment, and a gas flow rate at the time of this mixing is more than 5.0 cm/sec.

[5] A production method of the high dispersible hydrophobic fine silica powder according to any one of from above [1] to [3], wherein the gas flow rate in the fluidized bed type reaction vessel is more than 3.0 cm/sec at the time of the hydrophobic treatment.

DETAILED EXPLANATION OF THE INVENTION

The fine silica powder of the present invention is the high dispersible hydrophobic fine silica powder, in which the hydrophobicity is more than 50%, the triboelectrostatic charge to the iron powder is more than −500 μC/g, the decomposition rate of the organic group on the powder surface is less than 15%, and preferably the transmittance of the 5% alcoholic dispersion liquid is more than 40%.

The above-described fine silica powder of the present invention can be obtained by using the fine silica powder synthesized by the vapor phase method or a dry process as a raw material. As for this silica powder as a raw material, the fine powder having the specific surface area of more than 200 $m^2/g$ by the BET method can be used. For example, so-called fumed silica (the product name is AEROSIL200, 300, 380, 380S produced by NIPPON AEROSIL CO., LTD), which is produced by flame hydrolysis of a silicon halide and has the specific surface area of less than 400 $m^2/g$ by the nitrogen adsorption method (the BET method), can be used.

As for the fine silica powder of the present invention, the powder, in which the amount of residual hydrochloride is dehydrochlorinated to less than 100 ppm, can be used. In the case of using the fine silica powder having the concentration of residual hydrochloride of more than 100 ppm, when the powder is mixed with the hydrophobic agent of the organic silicon compound, the adsorption efficiency of the organic silicon compound is decreased due to the hydrochloride adsorbed on the powder surface, and as the result, the hydrophobic treating level is decreased. This influence is small in the case of the fine silica powder having the small specific surface area but is large in the case of the fine silica powder having the large specific surface area.

The organic silicon compound used in the hydrophobic treatment of the fine silica powder of the present invention may be a volatile compound. An organic halosilane, an organic siloxane or the like can be used. In these compounds, dimethyldichlorosilane is low cost and suitable as the organic halosilane in general, from the view point of the reaction to the silica. Further, as the organic siloxane, octamethyl cyclotetrasiloxane is in general.

As a reaction device of the hydrophobic treatment, the fluidized bed type reaction vessel is suitable. It is preferable that the gas flow rate in the reaction vessel is more than 3.0 cm/sec. If the gas flow rate in the reaction vessel is less than 3.0 cm/sec, the flow state becomes unstable, and the fine silica powder may be reagglomerated, thus the desired dispersibility cannot be obtained. This tendency can be clearly found at the time of using the silica powder having the large specific surface area. It is more preferable that the gas flow rate in reaction vessel is more than 3.5 cm/sec.

The organic silicon compound as the hydrophobic agent is heated to be gasified, and mixed in the gas state with the raw material silica together with an inert gas as a carrier. As the inert gas as the carrier, nitrogen gas is suitable in the point of the cost. At the time of this mixing, the gasified hydrophobic agent may be introduced into the flowing vessel by an injector or the like. The gas flow rate can be controlled corresponding to the pressure and amount of the inert gas, the diameter of an injection nozzle in the injector, or the like. The gas flow rate of the hydrophobic agent can be controlled by controlling these parameters. It is preferable that the gas flow rate is more than 5.0 cm/sec. The agglomeration of the silica powder can be loosed by introducing the gaseous hydrophobic agent with the high gas flow rate of more than 5.0 cm/sec. If the gas flow rate to introduce the hydrophobic agent is less than 5.0 cm/sec, it is difficult to loose the agglomeration of the silica powder, thus the dispersibility of the hydrophobic silica powder is decreased. Further, in order to loose the agglomeration of the silica powder to improve the dispersion state further, the mixture may be took into a pulverizer after mixing the silica powder with the hydrophobic agent of the organic silicon compound. As the pulverizer, an air pulverizer (a jet mill), a high-speed rotary pulverizer or the like can be used.

It is preferably that the reaction temperature of the hydrophobic treatment is from 450 degree C. to 600 degree C., more preferably from 430 to 550 degree C. If the reaction temperature is less than this range, the reaction rate is decreased. Moreover, if the reaction temperature is more than this range, the organic group on the surface of the silica powder is decomposed. Further, when the oxygen concentration is low, it is advantageous in the point of the cost. The oxygen concentration in the flowing vessel becomes inevitably low by introducing the inert gas so much.

By controlling the production conditions as described above, as for the fine silica powder having the specific surface area of more than 200 $m^2/g$ by the BET method, it is possible to obtain the high dispersible hydrophobic fine silica powder, in which the hydrophobicity is more than 50%, the troboelectrostatic charge is more than −500 μC/g, the decomposition rate of the organic group on the powder surface is less than 15%, and the transmittance of the 5% alcoholic dispersion liquid is more than 40%.

As for the hydrophobic fine silica powder of the present invention, the decomposition rate of the organic group on the powder surface is controlled to less than 15%, while having the high hydrophobicity of more than 50%, thus the high triboelectrostatic charge of more than −500 μC/g can be obtained. Moreover, the fine silica powder is not colored, thus the appearance is not damaged at the time of adding said powder to silicone resins, acrylic resins or the like. Further, the hydrophobic fine silica powder of the present invention has the excellent dispersibility, and when the fine silica powder of the present invention is dispersed in 5% alcoholic liquid, the transmittance of more than 40% can be obtained.

EFFECTIVENESS OF THE INVENTION

The hydrophobic fine silica powder of the present invention is the hydrophobic fine silica powder having the low decomposition rate of the organic group on the powder surface and the excellent dispersibility even having the large specific surface area. Therefore, the high dispersible hydrophobic fine silica powder of the present invention is suitable as the filler for controlling the viscosity for the adhesives, the coating materials or the like, the reinforcing filler for the natural rubber, the synthetic rubber, the engineering plastics or the like, the filler for the antiblocking agent for the resin films, or the flowability improving agent for the toner for electrophotography, the powder coating materials or the like.

DETAILED DESCRIPTION OF THE PREFERRED EMBODIMENTS

Hereinafter, the present invention will be explained concretely with examples and comparison examples. In addition, the decomposition rate of the organic group on the surface of the silica powder, and the transmittance of the alcoholic dispersion liquid were measured as follows.

[Decomposition rate of the organic group]: The organic group on the surface of the fine silica powder carried out the hydrophobic treatment was heat decomposed with alkali in an ethyl silicate under an existence of potassium hydroxide or sodium hydroxide. The decomposed organic group was reacted with the ethyl silicate to become a corresponding ethoxysilane. More concretely, said organic group became dimethyldiethoxysilane and methyltriethoxysilane. The quantitative analysis of this product was carried out by a gas chromatograph to measure the ratio of each ethoxysilane. Based on this measured ratio, the decomposition rate of the organic group on the surface of the silica powder was determined.

[Transmittance of the alcoholic dispersion liquid]: 5 g of the silica powder was mixed with 100 g of an isopropyl alcohol to be wet, and the wet mixture was dispersed at 300 W for 3 minutes by an ultrasonic dispersion machine. After that, the dispersed mixture was taken into a quartz cell having a capacity of 1 cm to measure the transmittance at a wavelength of 700 nm with a spectrophotometer.

EXAMPLE 1

The hydrophobic fine silica powder was prepared by mixing 2 kg/h of an amorphous silica with 0.4 kg/h of dimethyldichlorosilane and reacting this mixture at a temperature of 480 degree C., wherein this silica was produced by the vapor phase method and had the specific surface area of 200 $m^2$/g and the amount of residual hydrochloride of about 30 ppm. The reaction was carried out using the fluidized bed type reaction vessel. dimethyldichlorosilane (DDS) and nitrogen gas as a carrier were introduced. The gas flow rate was controlled to 45 cm/sec, and the gas flow rate in the reaction vessel was controlled to 3.9 cm/sec. As for the produced hydrophobic fine silica powder, the decomposition rate of the organic group, the amount of the generated carbon, the hydrophobicity, the triboelectrostatic charge, the transmittance of the alcoholic dispersion liquid and the appearance of the dispersion liquid were measured and shown in Table 1 together with the hydrophobic conditions.

EXAMPLE 2

The hydrophobic treatment was carried out with the same conditions as Example 1 excepting that the amorphous silica produced by the vapor phase method having the specific surface area of 300 $m^2$/g and the amount of residual hydrochloride of 50 ppm, was used and the amount of dimethyldichlorosilane was 0.6 kg/h. As for the produced hydrophobic fine silica powder, the decomposition rate of the organic group, the amount of the generated carbon, the hydrophobicity, the triboelectrostatic charge, the transmittance of the alcoholic dispersion liquid and the appearance of the dispersion liquid were measured and shown in Table 1 together with the hydrophobic conditions.

EXAMPLE 3

The hydrophobic treatment was carried out with the same conditions as Example 1 excepting that octamethyltetracyclosiloxane (D4) was used as the treating agent. As for the produced hydrophobic fine silica powder, the decomposition rate of the organic group, the amount of the generated carbon, the hydrophobicity, the triboelectrostatic charge, the transmittance of the alcoholic dispersion liquid and the appearance of the dispersion liquid were measured and shown in Table 1 together with the hydrophobic conditions.

EXAMPLE 4

The hydrophobic treatment was carried out with the same conditions as Example 2 excepting that octamethyltetracyclosiloxane (D4) was used as the treating agent in Example 2. As for the produced hydrophobic fine silica powder, the decomposition rate of the organic group, the amount of the generated carbon, the hydrophobicity, the triboelectrostatic charge, the transmittance of the alcoholic dispersion liquid and the appearance of the dispersion liquid were measured and shown in Table 1 together with the hydrophobic conditions.

COMPARISON EXAMPLE 1

The hydrophobic treatment was carried out with the same conditions as Example 1 excepting that the amount of the inert gas (nitrogen gas) for flowing was decreased to $\frac{1}{10}$ and the gas flow rate in the reaction vessel was controlled to 1.6 cm/sec in Example 2. As for the produced hydrophobic fine silica powder, the decomposition rate of the organic group, the amount of the generated carbon, the hydrophobicity, the triboelectrostatic charge, the transmittance of the alcoholic dispersion liquid and the appearance of the dispersion liquid were measured and shown in Table 1 together with the hydrophobic conditions.

COMPARISON EXAMPLE 2

The hydrophobic treatment was carried out with the same conditions as Example 2 excepting that the gas flow rate of dimethyldichlorosilane was controlled to 21 cm/sec in Example 2. As for the produced hydrophobic fine silica powder, the decomposition rate of the organic group, the amount of the generated carbon, the hydrophobicity, the triboelectrostatic charge, the transmittance of the alcoholic dispersion liquid and the appearance of the dispersion liquid were measured and shown in Table 1 together with the hydrophobic conditions.

COMPARISON EXAMPLE 3

The hydrophobic treatment was carried out with the same conditions as Example 2 excepting that the silica powder having the amount of residual hydrochloride of 140 ppm was used in Example 2. As for the produced hydrophobic fine silica powder, the decomposition rate of the organic group, the amount of the generated carbon, the hydrophobicity, the triboelectrostatic charge, the transmittance of the alcoholic dispersion liquid and the appearance of the dispersion liquid were measured and shown in Table 1 together with the hydrophobic conditions.

COMPARISON EXAMPLE 4

The hydrophobic treatment was carried out with the same conditions as Example 3 excepting that the amount of the inert gas (nitrogen gas) for flowing was decreased to 1/10 and the gas flow rate in the reaction vessel was controlled to 1.5 cm/sec in Example 3. As for the produced hydrophobic fine silica powder, the decomposition rate of the organic group, the amount of the generated carbon, the hydrophobicity, the triboelectrostatic charge, the transmittance of the alcoholic dispersion liquid and the appearance of the dispersion liquid were measured and shown in Table 1 together with the hydrophobic conditions.

As shown in Table 1, as for each fine silica powder of Examples 1 to 4 of the present invention, although the hydrophobicity was more than 56%, the decomposition rate of the organic group on the powder surface was less than 6%, the amount of the generated carbon is less than 2%, the triboelectrostatic charge was more than −500 μC/g, the transmittance of the alcoholic dispersion liquid was more than 42%, and the appearance of the dispersion liquid was sufficient. On the other hand, as for the fine silica powders of Comparison examples 1 to 4, the decomposition rate of the organic group on the powder surface was high, the triboelectrostatic charge and the transmittance of the alcoholic dispersion liquid were low, and the appearance of the dispersion liquid was insufficient, as compared with the fine silica powders of Example 1 to 4.

TABLE 1

| | Examples | | | | Comparison examples | | | |
| --- | --- | --- | --- | --- | --- | --- | --- | --- |
| | 1 | 2 | 3 | 4 | 1 | 2 | 3 | 4 |
| Silica Powder as Raw Material ($m^2/g$) | 200 | 300 | 200 | 300 | 300 | 300 | 300 | 200 |
| Organic Silicon Compound (Hydrophobic Agent) | DDS | DDS | D4 | D4 | DDS | DDS | DDS | D4 |
| Gas Flowing Rate in Reaction Vessel (cm/s) | 3.9 | 3.9 | 3.7 | 3.8 | 1.6 | 3.9 | 3.9 | 1.5 |
| Gas Flow Rate (cm/s) | 8.5 | 9.5 | 8.5 | 9.5 | 9.5 | 4.2 | 9.5 | 8.5 |
| Amount of Residual Hydrochloride (ppm) | 30 | 50 | 30 | 50 | 40 | 50 | 140 | 30 |
| Specific Surface Area after Treatment ($m^2/g$) | 172 | 242 | 165 | 237 | 229 | 232 | 267 | 172 |
| Decomposition Rate of Organic Group on Surface (%) | 4 | 5 | 5 | 6 | 16 | 5 | 3 | 18 |
| Carbon Amount of Treated Silica (%) | 1.4 | 1.9 | 1.4 | 2 | 2 | 2 | 1.7 | 1.5 |
| Hydrophobicity (%) | 58 | 56 | 58 | 58 | 59 | 57 | 47 | 58 |
| Triboelectrostatic Charge (μC/g) | −543 | −624 | −558 | −606 | −490 | −422 | −341 | −488 |
| Transmittance of Alcoholic Dispersion Liquid (%) | 46 | 55 | 42 | 53 | 39 | 34 | 59 | 30 |
| Appearance of Dispersion Liquid | Sufficient | Sufficient | Sufficient | Sufficient | Insufficient | Insufficient | Sufficient | Insufficient |

INDUSTRIAL APPLICABILITY

The high dispersible hydrophobic fine silica powder of the present invention is suitable as the filler for controlling the viscosity for the adhesives, the coating materials or the like, the reinforcing filler for natural rubber, synthetic rubber, engineering plastics or the like, the filler for the antiblocking agent for the resin films, or the flowability improving agent for the toner for electrophotography, the powder coating materials or the like.

What is claimed is:

1. A high dispersible hydrophobic fine silica powder, wherein
   hydrophobicity is more than 50%, and
   triboelectrostatic charge to an iron powder is more than −500 μC/g.

2. The high dispersible hydrophobic fine silica powder according to claim 1, wherein transmittance of a 5% alcoholic dispersion liquid is more than 40%.

3. The high dispersible hydrophobic fine silica powder of claim 2, wherein said high dispersible hydrophobic fine silica powder is synthesized by a vapor phase method, and has a specific surface area of more than 200 $m^2/g$ by the BET method and an amount of residual hydrochloride of less than 100 ppm.

4. A production method of the high dispersible hydrophobic fine silica powder according to claim 3, wherein a hydrophobic agent comprising a volatile organic silicon compound is mixed in the gas state with a fine silica powder in a fluidized bed type reaction vessel at the time of a hydrophobic treatment, and a gas flow rate at the time of this mixing is more than 5.0 cm/sec.

5. The production method of the high dispersible hydrophobic fine silica powder according to claim 4, wherein a gas flow rate in the fluidized bed type reaction vessel is more than 3.0 cm/sec at the time of the hydrophobic treatment.

6. A production method of the high dispersible hydrophobic fine silica powder according to claim 2, wherein a hydrophobic agent comprising a volatile organic silicon compound is mixed in the gas state with a fine silica powder in a fluidized bed type reaction vessel at the time of a hydrophobic treatment, and a gas flow rate at the time of this mixing is more than 5.0 cm/sec.

7. The production method of the high dispersible hydrophobic fine silica powder according to claim 6, wherein a gas flow rate in the fluidized bed type reaction vessel is more than 3.0 cm/sec at the time of the hydrophobic treatment.

8. The high dispersible hydrophobic fine silica powder claim 1, wherein said high dispersible hydrophobic fine silica powder is synthesized by a vapor phase method, and has a specific surface area of more than 200 $m^2/g$ by the BET method and an amount of residual hydrochloride of less than 100 ppm.

9. A production method of the high dispersible hydrophobic fine silica powder according to claim 8, wherein a hydrophobic agent comprising a volatile organic silicon compound is mixed in the gas state with a fine silica powder in a fluidized bed type reaction vessel at the time of a hydrophobic treatment, and a gas flow rate at the time of this mixing is more than 5.0 cm/sec.

10. The production method of the high dispersible hydrophobic fine silica powder according to claim 9, wherein a gas flow rate in the fluidized bed type reaction vessel is more than 3.0 cm/sec at the time of the hydrophobic treatment.

11. A production method of the high dispersible hydrophobic fine silica powder according to claim 1, wherein a hydrophobic agent comprising a volatile organic silicon compound is mixed in the gas state with a fine silica powder in a fluidized bed type reaction vessel at the time of a hydrophobic treatment, and a gas flow rate at the time of this mixing is more than 5.0 cm/sec.

12. The production method of the high dispersible hydrophobic fine silica powder according to claim 11, wherein a gas flow rate in the fluidized bed type reaction vessel is more than 3.0 cm/sec at the time of the hydrophobic treatment.

* * * * *